US012194755B2

(12) United States Patent
Castano Aspas et al.

(10) Patent No.: US 12,194,755 B2
(45) Date of Patent: Jan. 14, 2025

(54) PRINTER RECIRCULATION CONTROL

(71) Applicant: Hewlett-Packard Development Company, L.P., Spring, TX (US)

(72) Inventors: Jorge Castano Aspas, Sant Cugat del Valles (ES); Albert Crespi Serrano, Sant Cugat del Valles (ES); Miquel Boleda Busquets, Sant Cugat del Valles (ES); Tuomo Eljas Kaikkonen, Sant Cugat del Valles (ES); David Butinya Teixido, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 185 days.

(21) Appl. No.: 17/866,164

(22) Filed: Jul. 15, 2022

(65) Prior Publication Data

US 2022/0348025 A1    Nov. 3, 2022

Related U.S. Application Data

(63) Continuation of application No. 16/959,044, filed as application No. PCT/US2019/052224 on Sep. 20, 2019, now Pat. No. 11,590,763.

(51) Int. Cl.
*B41J 2/185* (2006.01)
*B41J 2/175* (2006.01)

(52) U.S. Cl.
CPC ........... *B41J 2/185* (2013.01); *B41J 2/17546* (2013.01); *B41J 2/17596* (2013.01)

(58) Field of Classification Search
CPC ............. B41J 2/17566; B41J 2/17546; B41J 2/17596; B41J 2/18; B41J 2/185; B41J 2002/17589
See application file for complete search history.

(56) References Cited

U.S. PATENT DOCUMENTS 6,019,449 A    2/2000   Bullock et al.
6,474,771 B2   11/2002   Kim
(Continued)

FOREIGN PATENT DOCUMENTS

CN    107364234 A    11/2017
CN    107848300 A     3/2018
(Continued)

OTHER PUBLICATIONS

International Bureau, "International Preliminary Report on Patentability," issued in connection with International Patent Application No. PCT/US2019/052224, dated Mar. 15, 2022, 18 pages.
(Continued)

*Primary Examiner* — An H Do
(74) *Attorney, Agent, or Firm* — Foley & Lardner LLP

(57) ABSTRACT

Certain examples relate to controlling recirculation processes in a printing apparatus. An example printing material cartridge includes a reservoir storing printing material to supply a printing apparatus; memory; and instructions for controlling a recirculation process in the printing apparatus, the instructions stored in the memory, the recirculation process to cause the printing material to move between the reservoir and a second printing material cartridge, the second printing material cartridge separately replaceable from the printing material cartridge in the printing apparatus.

15 Claims, 9 Drawing Sheets

(56) References Cited

U.S. PATENT DOCUMENTS

| | | |
|---|---|---|
| 8,554,958 B1 | 10/2013 | Weiser et al. |
| 8,805,211 B2 | 8/2014 | Homma et al. |
| 9,819,835 B2 | 11/2017 | Nichols et al. |
| 9,852,282 B2 | 12/2017 | Jeran et al. |
| 10,237,451 B2 | 3/2019 | Gondek et al. |
| 10,245,830 B2 | 4/2019 | Korthuis et al. |
| 11,097,550 B2 * | 8/2021 | Smith .................. B41J 2/17513 |
| 11,110,702 B2 | 9/2021 | Martin et al. |
| 2002/0191042 A1 | 12/2002 | Paul et al. |
| 2011/0148957 A1 | 6/2011 | Park et al. |
| 2015/0066794 A1 | 3/2015 | Maguire |
| 2016/0159102 A1 | 6/2016 | Kaneko |
| 2017/0183525 A1 | 6/2017 | Fujioka et al. |
| 2017/0210126 A1 | 7/2017 | Kato |
| 2017/0283637 A1 | 10/2017 | Sakai |
| 2018/0056658 A1 | 3/2018 | Kobayashi |
| 2018/0300352 A1 | 10/2018 | Sanchez Ribes et al. |
| 2019/0143704 A1 | 5/2019 | Smith |
| 2019/0184704 A1 | 6/2019 | Korthuis et al. |
| 2019/0193404 A1 | 6/2019 | Nishida |
| 2020/0238695 A1 | 7/2020 | Chen et al. |

FOREIGN PATENT DOCUMENTS

| | | |
|---|---|---|
| EP | 3199356 A1 | 8/2017 |
| WO | 2016/068990 A1 | 5/2016 |
| WO | 2017/086989 A1 | 5/2017 |
| WO | 2018/186844 A1 | 10/2018 |

OTHER PUBLICATIONS

International Searching Authority, "International Search Report," issued in connection with International Patent Application No. PCT/US2019/052224, mailed on Aug. 7, 2020, 6 pages.

International Searching Authority, "Written Opinion," issued in connection with International Patent Application No. PCT/US2019/052224, mailed on Aug. 7, 2020, 17 pages.

\* cited by examiner

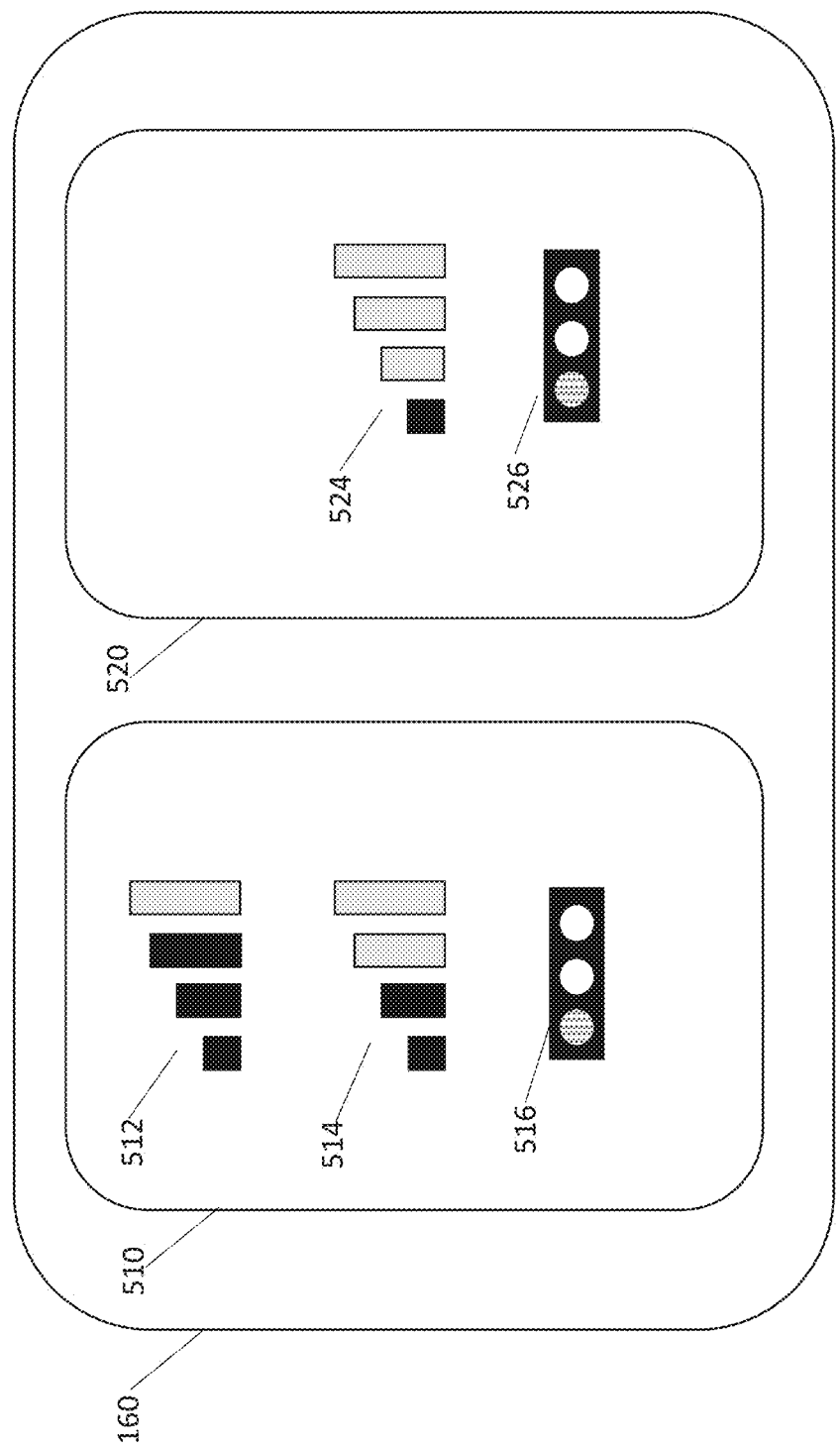

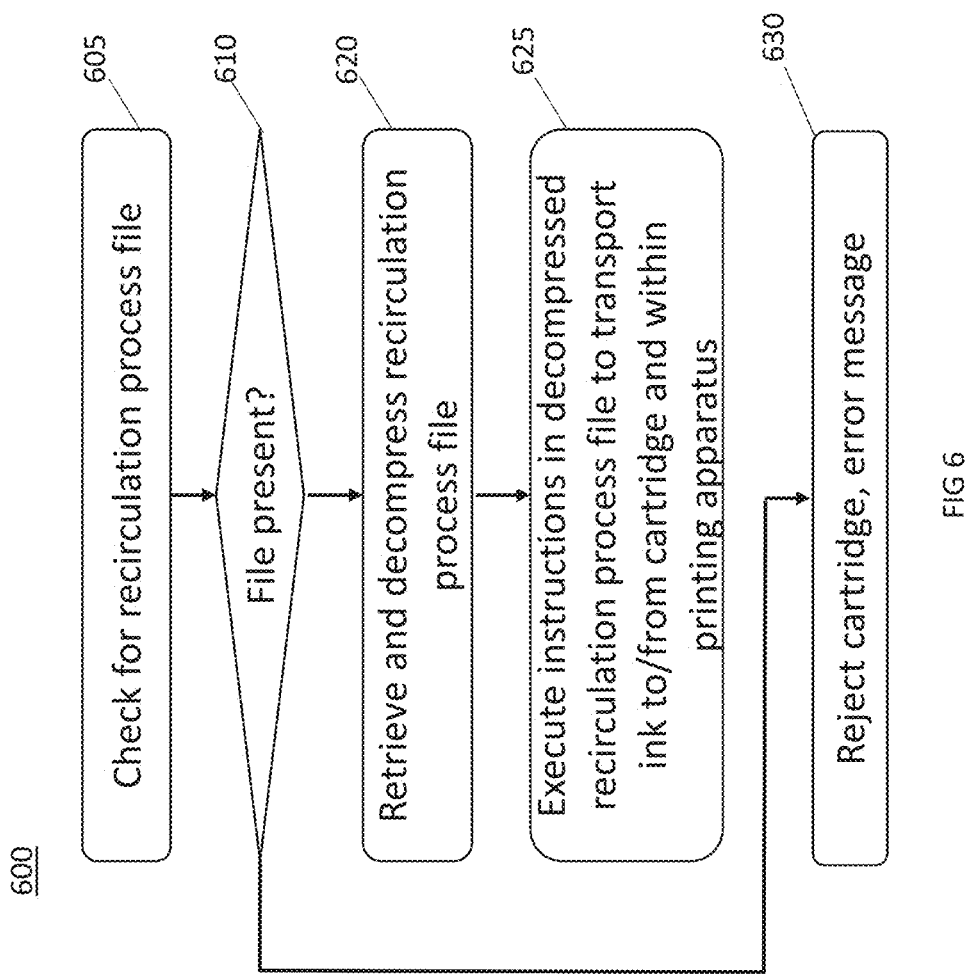

PRINTER RECIRCULATION CONTROL

RELATED APPLICATIONS

This patent is a continuation of U.S. patent application Ser. No. 16/959,044, filed on Jun. 29, 2020, and entitled "PRINTER RECIRCULATION CONTROL." U.S. patent application Ser. No. 16/959,044 arises from the U.S. national stage of International Patent Application No. PCT/US19/52224, filed on Sep. 20, 2019, and entitled "PRINTER RECIRCULATION CONTROL." U.S. patent application Ser. No. 16/959,044 and International Patent Application No. PCT/US19/52224 are hereby incorporated by reference in their entireties. Priority to U.S. patent application Ser. No. 16/959,044 and International Patent Application No. PCT/US19/52224 is hereby claimed.

BACKGROUND

Most types of printing apparatus are equipped with replaceable printing material cartridges that hold printing material for the printing process. Such printing material cartridges may include toner cartridges that contain laser printer toner, ink cartridges that contain different types of ink, ribbon cartridges that include inked ribbons, and 3D build material cartridges that contain build material for 3D printers. Ink and other fluid containing cartridges may include materials that require regular recirculation or mixing of the ink in order to avoid precipitating heavy particles which may block the printing apparatus.

BRIEF DESCRIPTION OF THE DRAWINGS

Various features of the present disclosure will be apparent from the detailed description which follows, taken in conjunction with the accompanying drawings, which together illustrate features of the present disclosure, and wherein:

FIG. 5 is a user interface display according to an example;

FIG. 6 is a flow chart showing a method of operating a printing apparatus according to another example;

DETAILED DESCRIPTION

Figure 1:
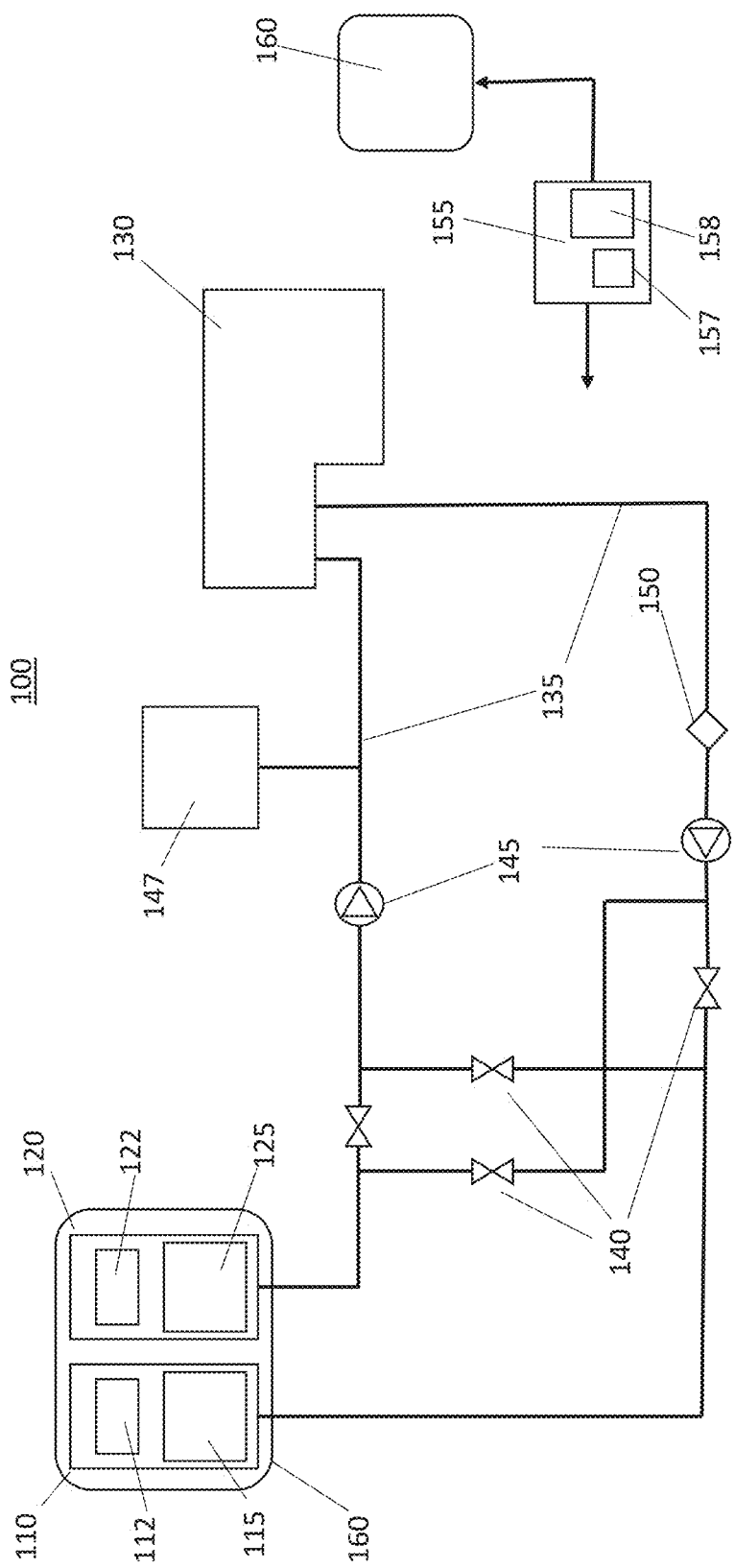
FIG. 1 is a schematic illustration of a printing apparatus and supply and mixing cartridges according to an example.

Printing material cartridges, such as those used for an ink jet printing apparatus, may contain a printing fluid which may be applied to a print medium by the printing apparatus. The term "printing fluid" includes all fluids that may be deposited on a print medium from a cartridge and includes fluids such as ink, toner, varnish, gloss, etc. Printing material cartridges may also contain other material for use in printing processes including build material, heat absorbing or reducing agents, and colorants for 3D printing. For ease of explanation, an example of ink is used in the description herein; however, this should not be seen as limiting. An ink may be oil or water based with one or more colorants, e.g. inks may be supplied as cyan, magenta, yellow and/or black inks.

A printing material cartridge may comprise a reservoir or printing ink container for storing the ink, as well as an integrated circuit having memory and a processor to perform identification, authentication, and other processes such as retrieving parameters related to the ink which may be used by the printing apparatus. The integrated circuit or smartchip is protected using memory encryption and limited logic operations of the processor to ensure that the cartridge may only be used with the printing apparatus in an approved predetermined manner. For example, the printing apparatus may only use the cartridge when it contains a predetermined memory setting that is not configurable by an external process, such as a code that may be verified by the printing apparatus. An example mechanism for secure interaction between the integrated circuit of the cartridge and the printing apparatus is described in PCT published patent document WO2016/068990.

The printing apparatus may retrieve information about the ink supplied by the cartridge to ensure the cartridge has been installed correctly, is supported by the printing apparatus, or allows the printing apparatus to utilize appropriate color mapping or other processes dependent on characteristics of the ink such as color and chemical composition. The cartridge also comprises an interface containing electrical and fluid connections for interfacing with the printing apparatus. The cartridge is removable from the printing apparatus such as an inkjet printer, so that once the supply of ink is depleted, the cartridge may be replaced with a new cartridge having a full supply of ink.

Certain types of ink may contain heavy particles such as titanium dioxide ($TiO_2$) in white ink. Over time these particles may precipitate out of the liquid ink and fall to the lowest level of their container, conduit or local volume. These particles may cause blockages or other issues such as reduced quality image reproduction by the printing apparatus and therefore the printing apparatus may implement recirculation processes to regularly move the ink from one part of the printing apparatus to another in order to avoid precipitation so that the particles remain fully dissolved in the ink. Different types of ink containing different particles or different concentrations of the same particles may require different recirculation processes. Recirculation may also be used to address issues such as ink surface oxidation. Oxidation of ink at the surface is reduced by changing the ink at the surface using recirculation and thus reducing the air exposure duration of any given volume of ink. Recirculation may also be used to address other issues.

Using the incorrect recirculation process for an ink may result in poor image reproduction by the printing apparatus due to some precipitation of heavy particles, and may result in blockage due to insufficient mixing of the ink. The recirculation process appropriate for the ink contained in the cartridge may be preinstalled in the printing apparatus memory or added later using a firmware update, or the process may be downloaded manually by a user of the printing apparatus. However, it is not always possible to ensure that the correct recirculation process is used as this may depend on a user correctly identifying the ink in the cartridge or the process being available in the memory of the printing apparatus.

Some cartridges containing inks requiring recirculation may be provided with both a supply reservoir and a mixing reservoir which allows the printing apparatus to move the ink between the reservoirs on a regular basis in order to avoid precipitation of heavy particles. However, when the ink supply is depleted and the cartridge is replaced, both the supply reservoir and the mixing reservoir must be replaced as the cartridge is provided as a unitary product. Typically, the ink supply must be replenished more regularly than the mixing reservoir needs to be replaced as the mixing reservoir may only be replaced at the end of its life whereas the supply reservoir may be replaced upon depletion of ink supply. Therefore, replacing such cartridges is relatively expensive and environmentally unfriendly.

FIG. 1 illustrates a printing apparatus 100 including two removable cartridges 110 and 120. The printing apparatus comprises one or more print heads 130, one or more transport components such as pumps 145 and valves 140, one or more pressure sensors 150 and pipes or ink conduits 135 connecting the various parts. The printing apparatus may in some examples also comprise an intermediate ink storage tank 147. The printing apparatus also comprises a controller 155 for controlling the various parts of the apparatus and includes a processor 157 and memory 158. A user interface 160 provides printing apparatus status information to a user and may allow a user to control some functions. The user interface may include a display and input controls, for example a keypad or a touchscreen. The printhead 130 deposits ink drops onto a print medium and may be controlled to move across the print medium and deposit a controlled number of drops of ink at predetermined locations in order to preproduce an image.

The cartridges 110, 120 removably couple to a coupling interface 160 which provides fluid communication with other parts of the printing apparatus 100 as well as electrical connection with the controller 155. Each cartridge 110, 120 comprises an ink reservoir 115, 125 and an integrated circuit or smart-chip 112, 122 including protected memory. One of the cartridges is a supply cartridge 110 which is initially provided with a full reservoir 115 containing ink for use in printing by the printing apparatus and may be replaced when more ink is required. The other cartridge is a mixing cartridge 120 and is initially provided with an empty reservoir 125 and is independently replaceable of the supply cartridge 110, for example after a predetermined number of uses. The mixing cartridge 120 is used as a reservoir to facilitate ink recirculation in which ink is regularly moved around the printing apparatus to ensure the ink is mixed often enough in order to avoid precipitation of heavy particles. The controller 155 controls the pumps 145 and valves 140 in order to move the ink from the supply cartridge reservoir 115 to the mixing cartridge reservoir 125, the intermediate tank 147, and/or the printhead 130. This movement of ink is typically performed in repeated cycles known as recirculation events, where the movements are dependent on the ink. For example, some inks may need mixing more frequently than others.

The cartridge integrated circuits 112, 122 may be used to store data related to the ink, for example an identifier that can be used to determine an appropriate recirculation process, an authentication code for ensuring that only approved cartridges may be used with the printing apparatus, characteristics or other data related to the ink in order assist with accurate color reproduction by the printing apparatus. Integrated circuits 112 and 122 for a supply cartridge 110 and a mixing cartridge 120 and according to an example are shown in more detail in FIGS. 2 and 3 respectively.

The integrated circuit 112 for the supply cartridge 110 includes a processor 213, memory 217 and an interface 215 for connecting with the electrical part of the coupling interface 160. The processor 213 may be configured to provide limited functionality or may be instructed by the controller 155 of the printing apparatus, for example as an I2C slave. The memory 217 may contain protected fields that are not re-writable, or may only be writable in a limited way for example as a counter only writable in one direction (increasing or decreasing). Some of the fields may also be encrypted so that they can only be read with the correct key to ensure that some information is only available to approved printing apparatus. In an example the memory 217 includes a supply cartridge identifier 230, a printing material counter 232, a reservoir printing material level parameter 234, a removal protection parameter 236, a paired mixing cartridge identifier 250, recirculation process instructions 255, a printing material characteristics parameter 240, and secret key and authentication instructions for processor 242. Many of these data fields will be encrypted and otherwise protected to ensure their integrity.

The supply cartridge identifier 230 is a read only field containing a unique identifier for the cartridge. This may be used with the paired mixing cartridge identifier 250 to pair a supply cartridge and a mixing cartridge so that once paired they may only be used together. When the supply cartridge 110 is first used with the printing apparatus, the printing apparatus reads a mixing cartridge identifier from an installed mixing cartridge and writes this to the paired mixing cartridge identifier field 250 of the supply cartridge memory 217. The printing apparatus may be configured to only use the supply cartridge 110 when this field 250 matches a mixing cartridge identifier stored on the paired mixing cartridge 120. The supply cartridge identifier 230 may also be written to a corresponding paired supply cartridge identifier field 350 on the mixing cartridge as described in more detail below. This ensures that the supply and mixing cartridges are paired to each other to ensure correct operation of the system including for example avoiding mixing of incompatible inks. The printing apparatus may ensure that ink characteristics data stored on each cartridge are compatible, for example that only supply cartridges having the same ink as previously used in the mixing cartridge are paired. By ensuring that the supply cartridge and mixing cartridge only work together, printing system coherence is maintained. For example, only supply and mixing cartridges using the same ink are used together, the levels of the system ink and the ink in each reservoir 115, 125 are properly maintained and the use of counterfeit cartridges is avoided. Were a different supply cartridge to be installed with a different ink to that previously mixed in the mixing cartridge, the integrity of the color rendered by the ink would be reduced and mixing of these different inks may lead to other issues such as precipitation of heaving particles and blockage of the printing apparatus. This use of paired identifiers also helps to defeat the use of counterfeit cartridges which do not provide for storing of paired identifiers.

The printing material counter 232 is a non-resettable one-directional counter which is re-writable only to decrease (or increase) its value and is indicative of the total level or amount of ink in the printing apparatus 100, including the supply cartridge 110 and the mixing cartridge 120. This total system ink counter is initially at a maximum when the supply cartridge is first installed and reduces as the ink is used for printing. The counter may be updated by the printing apparatus, for example when monitoring the number of drops of ink used in a print job. The counter is not changed when the ink is moved as part of a recirculation process, for example from the supply cartridge to the mixing cartridge, but only when the ink is consumed by printing so that the total or system ink is reduced.

The reservoir printing material level parameter 234 is indicative of the amount of printing material in the reservoir 115 and is a rewritable field that may be updated by the printing apparatus, based for example on sensors in the reservoir, flowmeters in the printing apparatus, or estimated based on recirculation events. The level of ink in the reservoir 115 may go up as well as down, for example when ink is transferred from the mixing cartridge back to the supply cartridge as part of a recirculation process.

The removal protection parameter 236 may be a resettable bit that is used to indicate whether the supply cartridge 110 may be removed from the printing apparatus 100. It may also be used to indicate whether the supply cartridge can be accepted upon installation. The removal protection parameter or bit may be set when not all of the ink in the printing apparatus is stored in the supply cartridge reservoir 115. In other words, there is still ink in the mixing cartridge 120. The removal protection bit may be unset when all system ink is contained in the supply cartridge. Whether or not the supply cartridge is removable may be indicated by the user interface 160, and a user interface control may allow a user to instruct the printing apparatus to move all ink to the supply cartridge so that it may be replaced.

By ensuring that all of the ink is returned to the supply cartridge before removal and replacement with a new supply cartridge, the maximum level of ink in the printing apparatus is not exceeded. For example if ink is retained in the mixing cartridge and a new supply cartridge is installed, the total system level of ink may be too great to allow for recirculation, thereby resulting in precipitation of particles and other issues such as inaccurate monitoring of total system ink levels leading to inaccurate indications of cartridge replacement requirements for example. If the supply cartridge 110 is removed anyway, even with the removal protection parameter indicating that it should not be, this bit will remain set so that the supply cartridge will not be accepted by another printing apparatus. The printing apparatus from which the supply cartridge was removed may need to perform some additional process before accepting any new supply cartridges, for example the mixing cartridge may need to be replaced with an empty one in order to ensure that the maximum level of ink in the printing apparatus is that provided with a new supply cartridge.

The printing material characteristics parameter 240 may contain information about the ink in the reservoir 115, for example it's color, chemical composition such as pigments used and their concentration compared with a carrier, the use and amount or concentration of dispersants, the use and amount or concentration of agents such as titanium dioxide, the use and amount or concentration of latex binders. Other information may include ink type or identifier, volume, manufacturing batch and other information. The field 242 containing secret key and authentication instructions for processor 213 is used by the processor to access the protected memory 217. The memory 217 also comprises recirculation process instructions 255 which may be used by the printing apparatus to perform recirculation processes relevant to the ink provided in the reservoir 115.

The integrated circuit 122 for the mixing cartridge 110 includes a processor 313, memory 317 and an interface 315 for connecting with the electrical part of the coupling interface 160. The processor 313 may be configured to provide limited functionality or may be instructed by the controller 155 of the printing apparatus, for example as an I2C slave. The memory 317 may contain protected fields that are not re-writable, or may only be writable in a limited way for example as a counter only writable in one direction (increasing or decreasing). Some of the fields may also be encrypted so that they can only be read with the correct key to ensure that some information is only available to approved printing apparatus. In an example the memory 317 includes a mixing cartridge identifier 330, a reservoir printing material level parameter 334, a removal protection parameter 336, a paired mixing cartridge identifier 350, a recirculation cycle counter 335, a maximum recirculation cycle parameter 337, a printing material characteristics parameter 340, and secret key and authentication instructions for processor 342. Many of these data fields will be encrypted and otherwise protected to ensure their integrity The mixing cartridge identifier 330 is a read only field containing a unique identifier for the cartridge. This may be used with the paired supply cartridge identifier 350 to pair a supply cartridge and a mixing cartridge so that once paired they may only be used together. When the mixing cartridge 120 is first used with the printing apparatus, the printing apparatus reads the mixing cartridge identifier 330 and writes this to the paired mixing cartridge identifier field 250 of the supply cartridge memory. Similarly, the printing apparatus reads a supply cartridge identifier from an installed supply cartridge and writes this to the paired supply cartridge identifier field 350 of the mixing cartridge memory 317. The printing apparatus may be configured to only use the mixing cartridge 120 when this field 350 matches a supply cartridge identifier stored on the paired supply cartridge 120. The printing apparatus may ensure that ink characteristics data stored on each cartridge are compatible, for example that only supply cartridges having the same ink as previously used in the mixing cartridge are paired. By ensuring that the supply cartridge and mixing cartridge only work together, printing system coherence is maintained. For example, only supply and mixing cartridges using the same ink are used together, the levels of the system ink and the ink in each reservoir 115, 125 are properly maintained and the use of counterfeit cartridges is avoided. Once a supply cartridge is depleted, the paired supply cartridge identifier may be erased so that a new supply cartridge can be installed, and its identifier written to the paired supply cartridge identifier field 350 so that the mixing cartridge and the new supply cartridge are now paired. In another example, the pairing of the supply and mixing cartridges may only occur when a recirculation process is ongoing and the supply and/or mixing cartridges may be removed and installed in other printing apparatus when the ink is fully contained in the supply cartridge.

The recirculation cycle counter 335 may be a non-resettable one-directional counter or field that stores the number of recirculation cycles or events experienced by the mixing cartridge 120. The counter 335 may be updated by the printing apparatus as recirculation cycles are performed, for example one cycle of moving the ink from the supply cartridge to the mixing cartridge and back to the supply cartridge. The maximum recirculation cycle parameter 337 is a read-only field that stores the maximum number of recirculation events that define the useable lifetime of the mixing cartridge 120. The value of this parameter may be dependent on the materials used to construct the mixing cartridge. When the value of the recirculation cycle counter 335 equals (or is greater than) the value of the maximum recirculation cycle parameter 337, the mixing cartridge is deemed unusable and can be replaced.

The reservoir printing material level parameter 334 for the mixing cartridge 120 is indicative of the amount of printing material in the reservoir 125 and is a rewritable field that may be updated by the printing apparatus, based for example on sensors in the reservoir, flowmeters in the printing apparatus, or estimated based on recirculation events. The level of ink in the reservoir 125 will vary depending on recirculation processes as ink is transferred to and from the mixing cartridge 120.

A removal protection parameter 336 may also be used in the mixing cartridge. The removal protection parameter may be a resettable bit that is used to indicate whether the mixing cartridge 110 may be removed from the printing apparatus 100. It may also be used to indicate whether the mixing cartridge can be accepted upon installation. The removal protection parameter or bit may be set when there is ink in the mixing cartridge reservoir 125. The removal protection bit 334 for the mixing cartridge may be unset when there is no ink in the mixing cartridge. Whether or not the supply cartridge is removable may be indicated by the user interface 160, and a user interface control may allow a user to instruct the printing apparatus to move all ink to the supply cartridge so that the mixing cartridge may be replaced.

The printing apparatus 100 may also store the cartridges identifiers 230 and 330 in memory 158 when setting the corresponding removal protection parameter 236 and 336 in the supply and mixing cartridge memories 217 and 317. This may allow the printing apparatus 100 to accept cartridges having their removal protection parameter 236 or 336 set when their cartridge identifier 230 or 330 matches that stored in the printing apparatus memory 158. This arrangement allows a cartridge 110 and/or 120 to be tied to a single printing apparatus 100 using the removal protection bit 236 or 336 stored on the cartridge memory 217, 317 and the cartridge identifier 230, 330 stored on the printer apparatus memory 158. For example even if the cartridge is removed with the removal protection bit set, the printing apparatus may be configured to accept it if its cartridge identifier 230, 330 is stored on the printing apparatus memory 158.

The printing material characteristics parameter 340 may contain information about the ink that the reservoir 125 may accept, for example it's color, chemical composition, type or identifier, volume, manufacturing batch and other information. The field 342 containing secret key and authentication instructions for processor 313 is used by the processor to access the protected memory 317.

Figure 2:
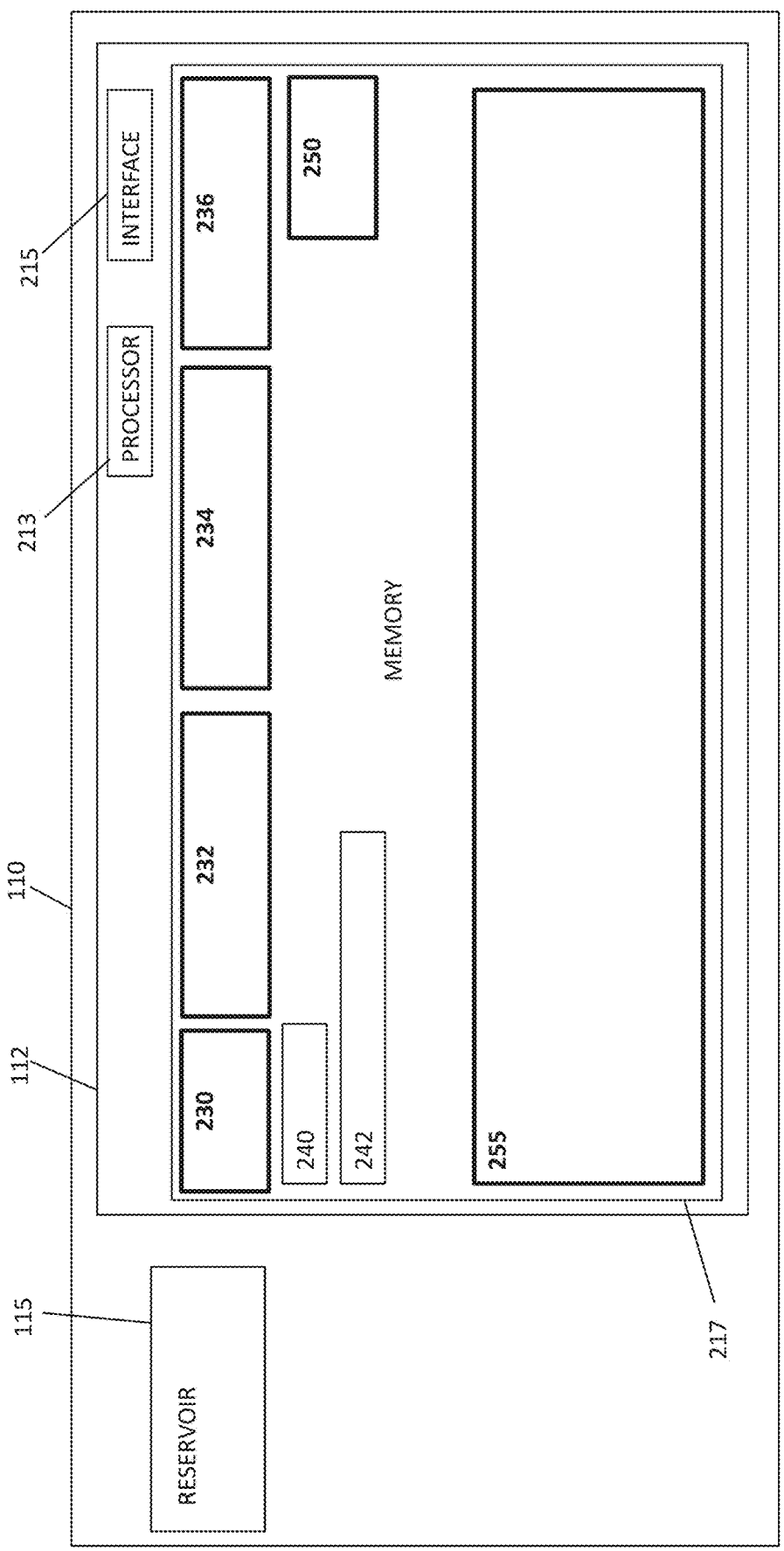
FIG. 2 is a schematic illustration of a supply cartridge according to an example.
Figure 3:
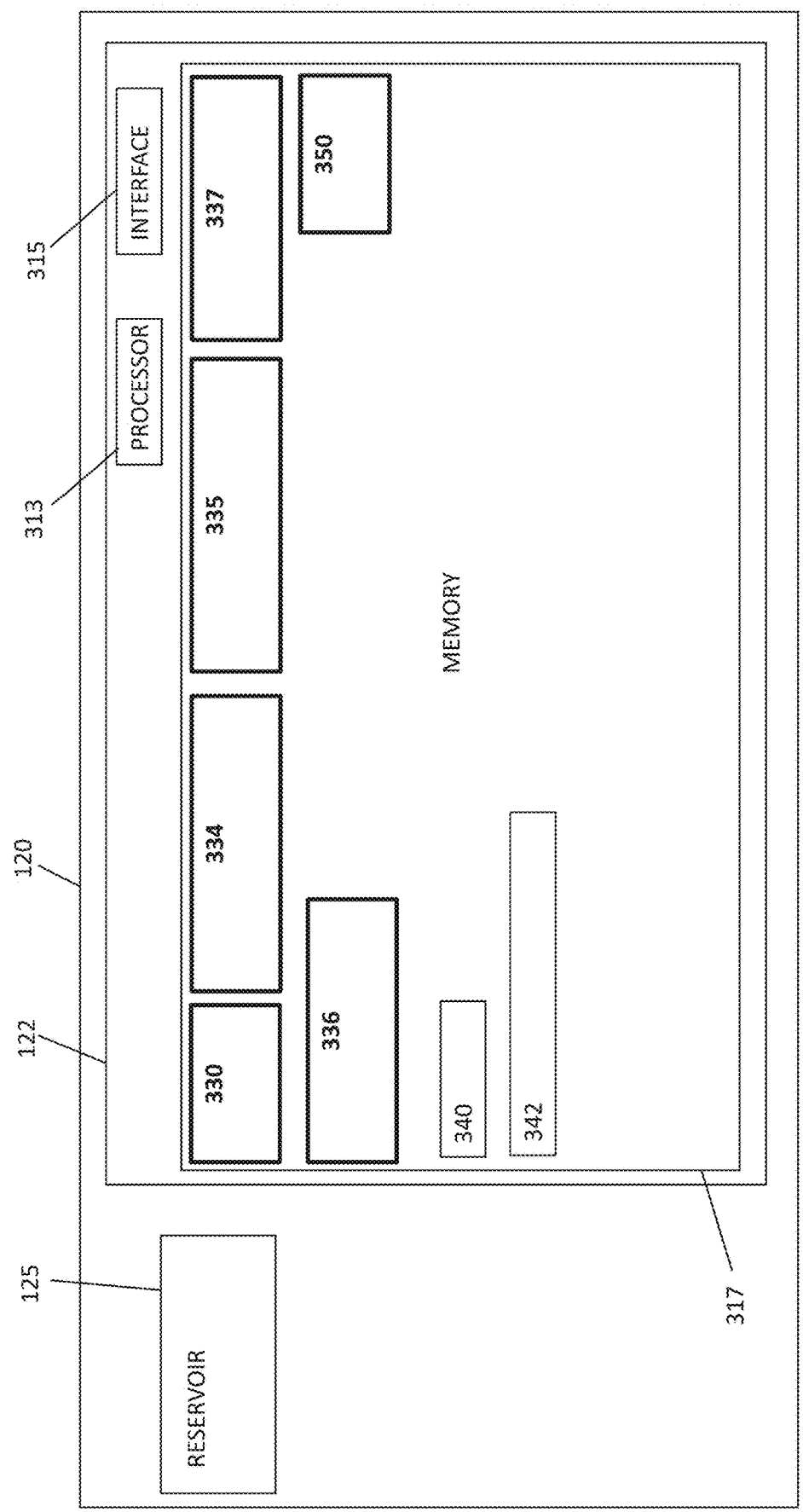
FIG. 3 is a schematic illustration of a mixing cartridge according to an example.
Figure 4:
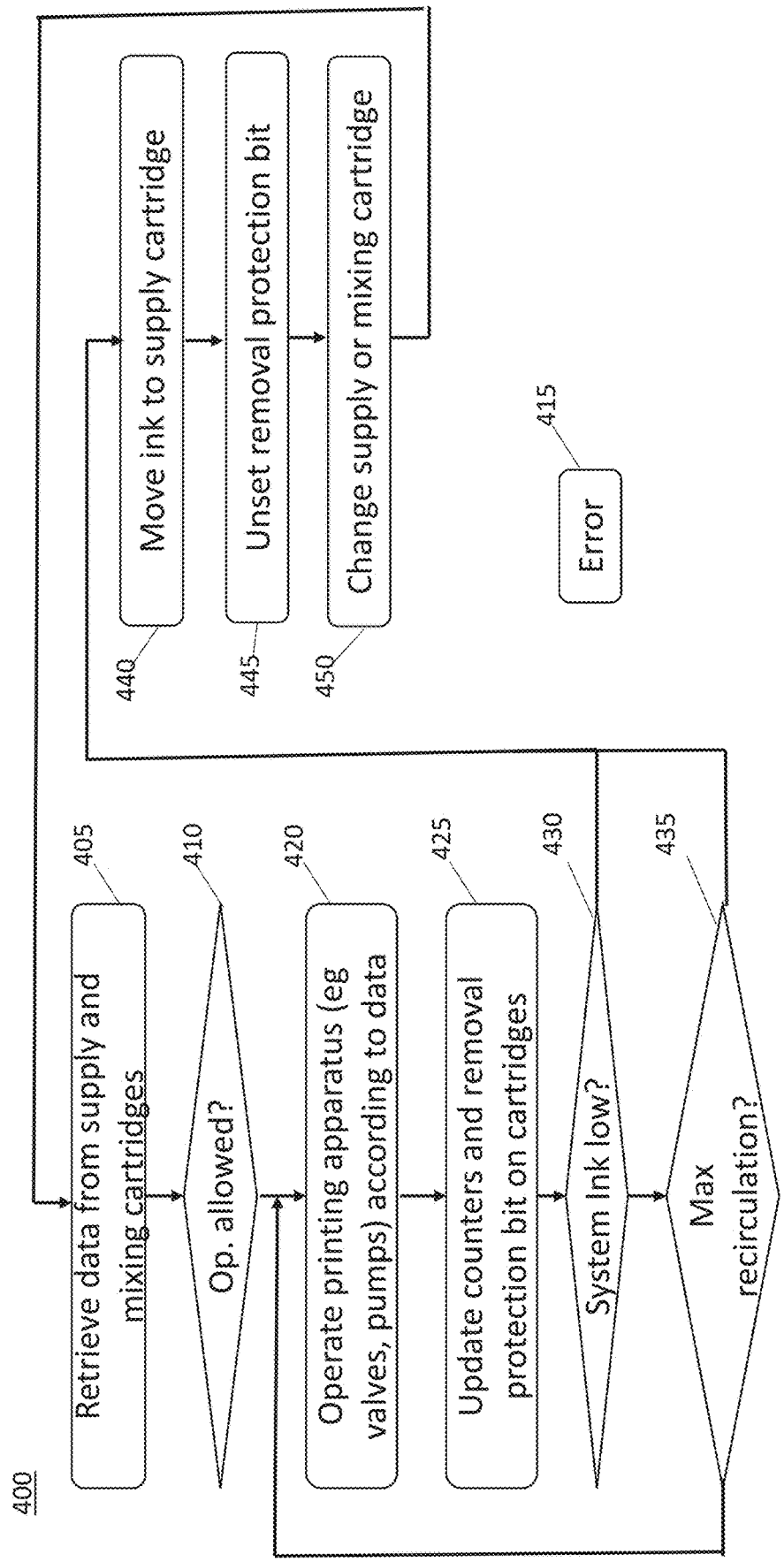
FIG. 4 is a flow chart showing a method of operating a printing apparatus according to an example.

FIG. 4 illustrates a method 400 of operating a printing apparatus and may be implemented by the controller 155 of the printing apparatus of FIG. 1 and the integrated circuits and fields in the supply and mixing cartridges 110, 120 of FIGS. 2 and 3. The method 400 may be performed to control recirculation of certain inks as well as to control use of separately removable supply and mixing cartridges. At block 405, the method 400 comprises retrieving data from the supply and mixing cartridges. The data may include ink characteristics parameters 240, 340, removal protection parameters 236, 336, cartridge identifiers 230, 330 and paired cartridge identifiers 250, 350, system ink counter 232, reservoir levels 234, 334, recirculation cycles counter 335 and maximum recirculation cycles 337.

At block 410, the method 400 determines whether this data allows operation of the printing apparatus to proceed. For example if the cartridge identifiers 230, 330 are not legitimate, if the removal protection bits 236, 336 are set, the paired cartridge identifier fields 250, 350 do not match the corresponding cartridge identifier fields 330, 230, or the recirculation cycle counter value 335 is not less than the value in the maximum recirculation cycles field 337, then the cartridges may be rejected by the printing apparatus 100.

In this case the method 400 may move to block 415 where an error message is displayed to a user on the user interface 160. A more detailed explanation of use of the paired cartridge identifiers 250, 350 is described in more detail below with respect to FIG. 8. If the data from the cartridges 110, 120 is determined to allow operation of the cartridges with the printing apparatus, the method moves to block 420. Otherwise the method moves to an error state 415 which may result in a user notification.

At block 420, the method 400 operates the printing apparatus 100 by controlling pumps 145 and values 140 to move ink between different parts of the printing apparatus. For example ink may be moved from the supply cartridge reservoir 115 to the intermediate tank 147 and/or to the mixing cartridge reservoir 125 in order to mix the ink to avoid precipitation of heaving particles. The ink may then be moved back to the supply cartridge reservoir 115 in order to complete a recirculation cycle. The ink may also be moved from the supply cartridge or the mixing cartridge to the printhead to enable printing of an image onto a printing medium.

At block 425, after each ink moving operation, the method updates the data fields in the cartridges 110, 120. For example, the reservoir printing material level parameters 234, 334 are updated as ink moves into and out of these storage volumes. Similarly, the printing material counter 232 is updated as the printhead expels ink, thereby reducing the total ink in the system. The removal protection parameter(s) 236, 336 are set when not all of the system ink is contained in the supply cartridge reservoir 115. This may be implemented by comparing the printing material counter 232 with the reservoir printing material level parameter 234 of the supply cartridge—if the former is larger than the later this indicates that some of the total system ink is contained in other parts of the printing apparatus, for example in the mixing cartridge. If the ink movement completes a recirculation cycle (e.g. moving ink back to the supply cartridge), the recirculation cycle counter 335 in the mixing cartridge is updated.

At block 430, the method 400 determines whether the system ink is low, for example by checking if the value of the printing material counter 232 is below a threshold. If this is not the case, the method moves to block 435 and determines whether the recirculation cycle counter 335 has reached its maximum threshold, the value stored in the maximum recirculation cycles field 337. If this is not the case, the method returns to the next printing apparatus operation at block 420.

If the total or system ink is low, the method moves to block 440 where the ink in the printing apparatus is moved to the supply cartridge reservoir 115. At block 445, the removal protection parameter 236 is unset which indicates that the supply cartridge may be replaced by a user at block 450. The method then returns to block 405. If the recirculation cycle counter 335 has reached its maximum threshold, the method 400 again moves to block 440 to ensure that any ink in the printing apparatus is moved to the supply cartridge 110. If a removal protection parameter 336 is used in the mixing cartridge 120, this may be unset at block 445 which indicates that the mixing cartridge may be replaced by a user at block 450. The method then returns to block 405.

Referring to FIG. 5, a display for the user interface 160 is shown. This includes a window 510 for a supply cartridge 110 and a window 520 for a mixing cartridge 120. The supply cartridge window includes an icon 512 indicating the total ink within the printing apparatus—in this case indicating that the total ink is at approximately 75% capacity. This icon corresponds to the printing material counter 232. A second icon 514 indicates the level of ink within the supply cartridge reservoir 115—in this case approximately half full and not all system ink is contained in the reservoir 115. This icon corresponds to the reservoir printing material level parameter 234 of the supply cartridge. A third icon 516 indicates whether the supply cartridge 110 can be removed, for example to replace with a new supply cartridge with full reservoir 115. This icon corresponds with the removal protection parameter 236 of the supply cartridge and may include a "don't remove" warning indicator when not all of the system ink is contained in the supply cartridge as is the situation shown. The mixing cartridge window 520 includes an icon 524 indicating the level of ink within the mixing cartridge reservoir 125—in this case approximately one quarter full. This icon corresponds to the reservoir printing material level parameter 334 of the mixing cartridge. Another icon 526 indicates whether the mixing cartridge 110 can be removed, for example to replace with a new mixing cartridge. This icon corresponds with the removal protection parameter 336 of the mixing cartridge (if used) and may include a "don't remove" warning indicator when not all of the system ink is contained in the supply cartridge (or when there is some ink in the mixing cartridge reservoir 125) as in the situation shown.

Figure 8:
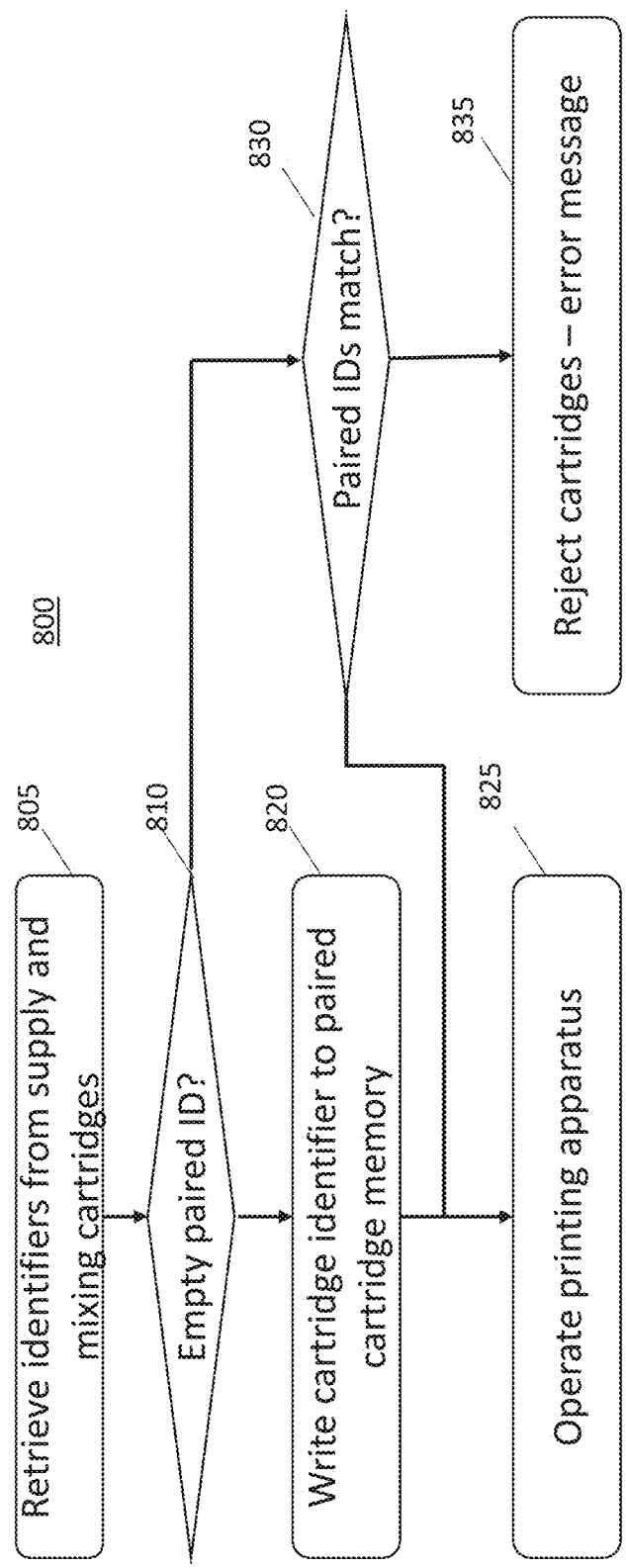
FIG. 8 is a method of operating a printing apparatus according to another example.

FIG. 8 illustrates a method 800 of operating a printing apparatus and may be implemented by the controller 155 of the printing apparatus of FIG. 1 and the integrated circuits and fields in the supply and printing cartridges 110, 120 of FIGS. 2 and 3. The method 800 may be performed to pair a supply cartridge with a particular mixing cartridge in order to prevent improper operation of the printing apparatus should one of the cartridges be replaced with a different type or a counterfeit cartridge which may not include some or all of the previously described fields used to enable the above described operation. Inaccurate or missing fields may result in incorrect operation of the printer, poor quality printing and possible damage. For example, as described above the printing apparatus tracks the total ink in the system as well as levels of ink in each of the reservoirs 115, 125 by updating data 232, 234, 334 securely stored in the memory 217, 317 of the cartridges 110, 120. If a different cartridge is incorrectly installed, the total ink level may be incorrect leading to poor operation of the printing apparatus and possibly damage.

At block 805 the method 800 retrieves cartridge identifiers 230, 330 from the supply and mixing cartridges 110, 120 and if available the paired cartridge identifiers 250, 350. At block 810 the method 800 determines if the paired cartridge identifiers 250, 350 from either cartridge are empty. This may occur if the cartridge 110 or 120 has been newly installed. In this case, the method moves to block 820 where the cartridge identifier 230 or 330 is written to the paired cartridge identifier field 350 or 250 of the other cartridge. For example, the cartridge identifier 230 of the supply cartridge 110 is written into the paired cartridge identifier 350 of the mixing cartridge 120. Similarly, the cartridge identifier 330 of the mixing cartridge 120 is written into the paired cartridge identifier 250 of the supply cartridge 120. Checks to ensure that the cartridges are not counterfeit may be performed initially, for example that an authentication process can be performed by each cartridge. If there are no fields for paired cartridge identifiers this may also indicate a counterfeit cartridge. In these cases an error message may be displayed to a user of the printing apparatus that the cartridge(s) can not be accepted.

If the paired cartridge identifiers 250, 350 are recovered, the method 800 moves to block 830 where these are checked against the cartridge identifier 230, 330 in the other cartridge. For example, the paired cartridge identifier 250 in the supply cartridge 110 is compared with the cartridge identifier 330 in mixing cartridge 120. If these do not match the method moves to block 835 where an error message is displayed to a user and the cartridge is rejected for use with the printing apparatus. Similarly, the paired cartridge identifier 350 in the mixing cartridge 120 is compared with the cartridge identifier 230 in supply cartridge 110. If these do not match the method moves to block 835 where an error message is displayed to a user and the cartridge is rejected for use with the printing apparatus. If the paired cartridge identifiers 250, 350 do match the cartridge identifiers 330, 230 on the other cartridge, then the method moves to block 825 where operation of the printing apparatus using the cartridges may begin—for example as described above.

The method 800 ties a supply and mixing cartridges together so that they can only be used together in a printing apparatus 100. The paired cartridge identifiers 250, 350 may be used with or without the removal protection parameters 236, 336 which can be used to tie a cartridge 110, 120 to a particular printing apparatus 100. For example, using only the paired cartridge identifiers 250, 350 it is possible that the corresponding cartridges 110, 120 may be used together in a different printing apparatus.

Referring to FIG. 6, a method 600 of operating a printing apparatus is illustrated and may be implemented by the controller 155 of the printing apparatus of FIG. 1 and the integrated circuits and fields in the supply cartridges 110 of FIG. 2. The method 600 may be performed to control recirculation processes within the printing apparatus 100 using process instructions stored on the supply cartridge 110. The recirculation process may be specific to ink stored in the reservoir 115 and/or to the printing apparatus 100 on which the recirculation is to be performed. As noted above, the process instructions may be stored in a field or location 255 of the integrated circuit memory 217. The process instructions may be stored in the form of an encrypted, compressed XML file, although other file types may alternatively be used. More than one set of process instructions may be stored for use with different printing apparatus.

At block 605, the printing apparatus checks the supply cartridge for a recirculation process file. Where multiple sets of process instructions are included for different printing apparatus, an index may be provided including printing apparatus identifiers to indicate whether the printing apparatus is supported. At block 610, if no process file or instructions are found, the method moves to block 630 to reject the cartridge and to indicate an error message to the user. If appropriate process instructions 255 are found, the method moves to block 620.

At block 620 the process instructions 255 are retrieved from the cartridge 110 and are decompressed. The decompressed process instructions may be in the form of an XML file containing instructions directly interpretable by the controller 155 of the printing apparatus 100. At block 625 the controller executes the instructions to transport ink to and from the cartridge 110 as well as within the printing apparatus in order to mix the ink to avoid precipitating particles which may cause blockages and/or reduce print quality.

An example of process instructions is shown below and is described with respect to FIGS. 7A and 7B. The printing apparatus 700 comprises pumps 745 (labelled P-1 and P-2 in the figure and pump_1 and pump_2 in the XML code below)

and valves 740 (labelled V-1, V-2, V-3, V-4 in the figure and valve_1, valve_2, valve_3, valve_4 in the XML code below). These transport components are controlled to move ink within the printing apparatus to its different parts, including to and from the supply cartridge 710 and a mixing cartridge 720. The heavy lines show transport of the ink, in the case of FIG. 7A from the supply cartridge 710 to the mixing cartridge 720, and in the case of FIG. 7B the reserve direction from the mixing cartridge back to the supply cartridge. This recirculation cycle may be repeated at predetermined time periods, following periods of inactivity where no printing occurs, or following or preceding other recirculation cycles. This or a combination of recirculation cycles may depend on the ink being transported and/or the printing apparatus used.

Figure 7B:
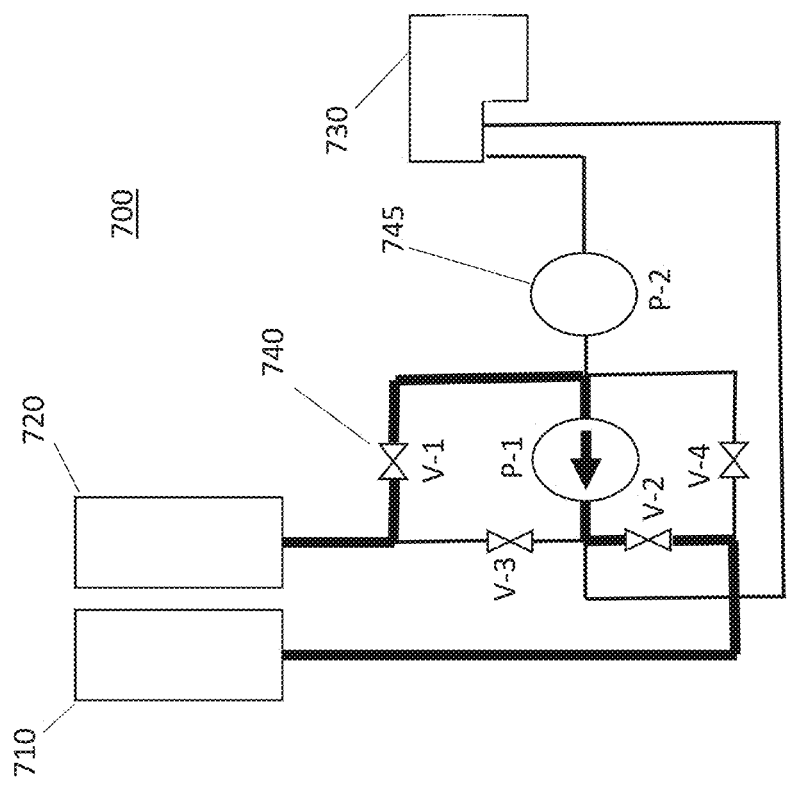
FIGS. 7A-7D are schematic illustrations of a printing apparatus and supply and mixing cartridges according to another example at different stages of a circulation process.
Figure 7A:
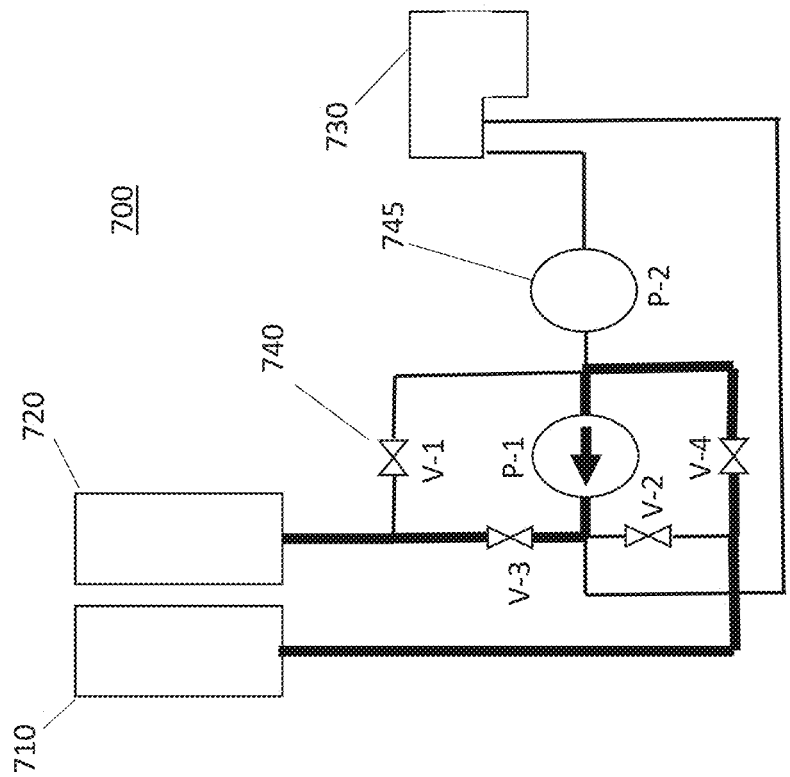

An XML file for the operations illustrated in FIGS. 7A and 7B is shown below:

```
<processing>
    <xml xml_index="1" version="1" encoding="utf-8"/>
    <mixing_AtoB>
    <pump_1 action="ON" duration="10" PWM= "50"
    direction="reverse"/>
    <pump_1 action="ON" duration="10" PWM= "50"
    direction="reverse"/>
    <pump_2 action="OFF" duration="10" PWM= "0"
    direction="forward"/>
        <valve_1 action="power_off" duration="20"/>
        <valve_2 action="power_off" duration="20"/>
        <valve_3 action="power_on" duration="20"/>
        <valve_4 action="power_on" duration="20"/>
        <trigger stop="time"/>
    </mixing_AtoB>
    <mixing_BtoA>
    <pump_1 action="ON" duration="10" PWM= "50"
    direction="reverse"/>
    <pump_2 action="OFF" duration="10" PWM= "0"
    direction="forward"/>
        <valve_1 action="power_on" duration="20"/>
        <valve_2 action="power_on" duration="20"/>
        <valve_3 action="power_off" duration="20"/>
        <valve_4 action="power_off" duration="20"/>
        <trigger stop="time"/>
    </mixing_BtoA>
</processing>
```

In order to move the ink from the supply cartridge 110 to the mixing cartridge 120, pump_1 (V-1) is turned on in the reverse direction and pump_2 (P-2) is off, valve_1 (V-1) and valve_2 (V-2) are closed and valve_3 (V-3) and valve_4 (V-4) are open. In order to move the ink back from the mixing cartridge 120 to the supply cartridge 110, pump_1 (V-1) is turned on in the reverse direction and pump_2(P-2) is off, valve_1 (V-1) and valve_2 (V-2) are open and valve_3 (V-3) and valve_4 (V-4) are closed. The process description or instructions are shown for printer xml_index=1; different printers may use the same or different process instructions.

Figure 7D:
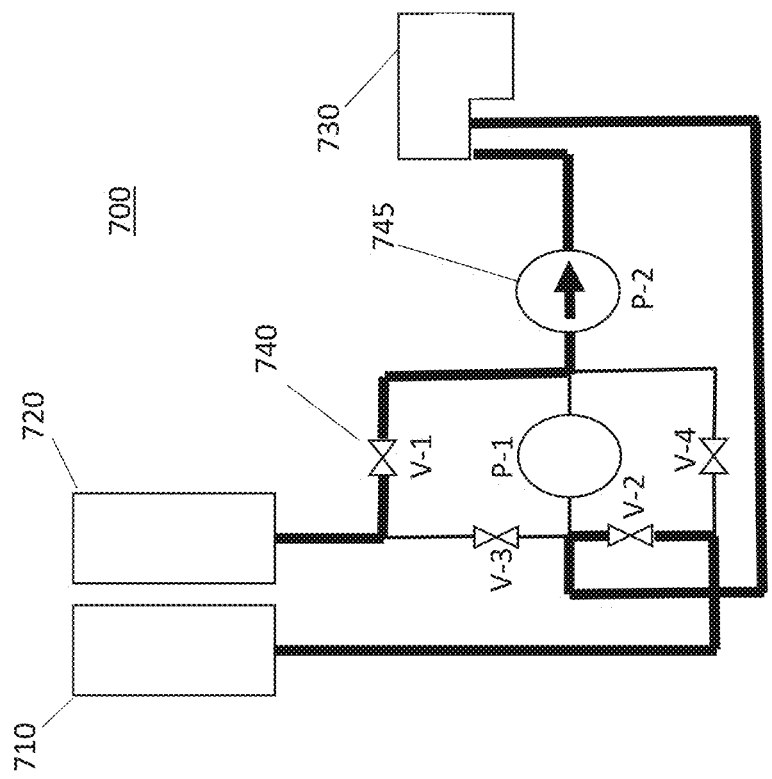
Figure 7C:
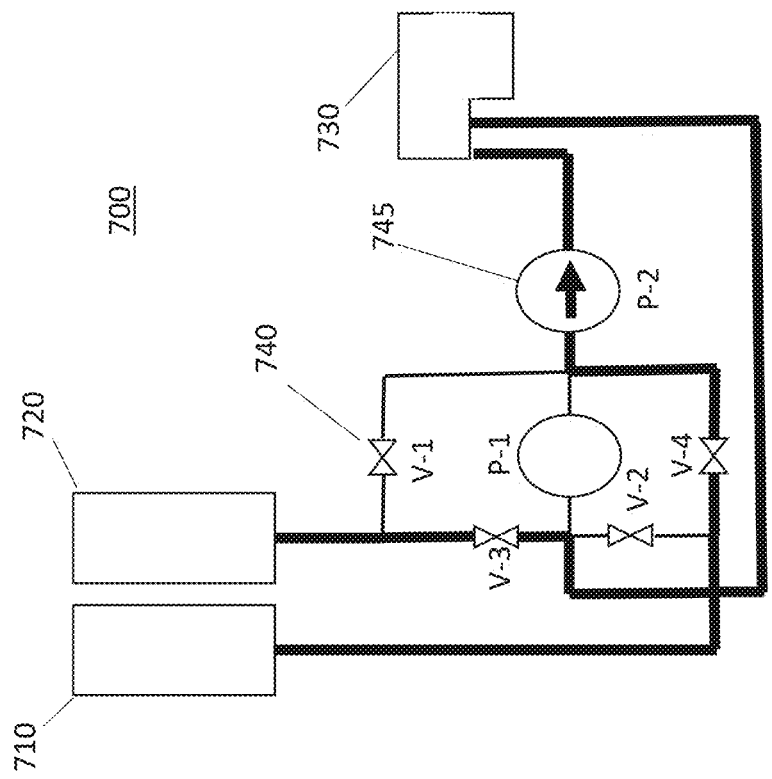

Process instructions for a different ink are shown below and are described with respect to FIGS. 7C and 7D. The instructions are for the same printing apparatus, or same group of printing apparatus, and requires more complex recirculation than the first ink type, including passing through the printhead 730.

In order to move the ink from the supply cartridge 110 to the mixing cartridge 120, pump_1 (V-1) is turned off and pump_2 (P-2) is turned on in the forward direction. Valve_1 (V-1) and valve_2 (V-2) are closed and valve_3 (V-3) and valve_4 (V-4) are open. In order to move the ink back from the mixing cartridge 120 to the supply cartridge 110, pump_1 (V-1) is turned off and pump_2 (P-2) is turned on in the forward direction. Valve_1 (V-1) and valve_2 (V-2) are open and valve_3 (V-3) and valve_4 (V-4) are closed.

An XML file for the operations illustrated in FIGS. 7A and 7B is shown below:

```
<processing>
    <xml xml_index="3" version="2" encoding="utf-8"/>
    <mixing_AtoB>
    <pump_1 action="OFF" duration="10" PWM= "50"
    direction="reverse"/>
    <pump_2 action="ON" duration="10" PWM= "25"
    direction="forward"/>
        <valve_1 action="power_off" duration="20"/>
        <valve_2 action="power_off" duration="20"/>
        <valve_3 action="power_on" duration="20"/>
        <valve_4 action="power_on" duration="20"/>
        <trigger stop="pressure" target="10psi"/>
    <pump_1 action="OFF" duration="10" PWM= "0"
    direction="reverse"/>
    <pump_2 action="OFF" duration="10" PWM= "0"
    direction="forward"/>
        <valve_1 action="power_off" duration="0"/>
        <valve_2 action="power_off" duration="0"/>
        <valve_3 action="power_off" duration="0"/>
        <valve_4 action="power_off" duration="0"/>
        <trigger stop="time"/>
    </mixing_AtoB>
    <mixing_BtoA>
    <pump_1 action="OFF" duration="10" PWM= "50"
    direction="forward"/>
    <pump_2 action="ON" duration="10" PWM= "25"
    direction="reverse"/>
        <valve_1 action="power_on" duration="20"/>
        <valve_2 action="power_on" duration="20"/>
        <valve_3 action="power_off" duration="20"/>
        <valve_4 action="power_off" duration="20"/>
        <trigger stop="pressure" target="10psi"/>
    <pump_1 action="OFF" duration="10" PWM= "0"
    direction="reverse"/>
    <pump_2 action="OFF" duration="10" PWM= "0"
    direction="forward"/>
        <valve_1 action="power_off" duration="0"/>
        <valve_2 action="power_off" duration="0"/>
        <valve_3 action="power_off" duration="0"/>
        <valve_4 action="power_off" duration="0"/>
        <trigger stop="time"/>
    </mixing_BtoA>
</processing>
```

A combination of these actions may be performed for predetermined time periods and the same or different pump rates. The same or different time periods may be used for controlling the valves. This file also has a higher version number so the printing apparatus uses the latest version even if an earlier version is stored locally, for example from a firmware update, or an earlier cartridge stored process description or instructions.

The controller 155 interprets the recirculation instructions and may control various components such as pumps using local operating system instructions. Various compression algorithms may be used for compressing the recirculation process instructions file, including for example those described in PCT patent publication WO2017/086989. Various authentication and control processes may be used to ensure that the process instructions 255 are protected in the integrated circuit or smart chip and are only accessible by authorized printing apparatus. For example, the cartridge processor 213 may be an I2C slave microcontroller and the printer controller processor 157 may be the I2C master. The microcontroller 213 may be read by the printer controller 155, 157 by addressing a read field and cryptographically authenticating the read message and loading into a read field, although other secure methods may be employed. An example of a mechanism for securely interacting with a cartridge is described in PCT patent publication WO2016/068990.

In another example, a separate removable mixing cartridge may not be used and the ink may be moved between the supply cartridge, an intermediate tank permanently within the printing apparatus and the printhead(s). In other examples a different file type may be used than XML to contain recirculation instructions which can be retrieved by a printing apparatus and executed. The recirculation process may be triggered in different ways, for example based on time, temperature, printer usage, ink levels, etc.

The process instructions may be adapted to the ink in the supply cartridge. For example, a whitening agent such as titanium dioxide TiO2 particles may be dissolved in a carrier together with a dispersant additive which keeps the particles in suspension longer, but this can decrease the performance of the ink in the printing process. The ratio between dispersant and TiO2 particles therefore needs to be carefully controlled and the recirculation processes can be tailored to ensure appropriate movement of the ink depending on different ink compositions in order to avoid precipitation of the particles. Therefore, the recirculation instructions may be updated as ink compositions change over time and the most appropriate recirculation procedures can be incorporated by printing apparatus when the supply cartridge is installed thereby effectively adapting older printers (as well as new printers) to changing ink compositions over time.

In some examples the ink may comprise one or more of the following: white pigments; titanium dioxide; dye sub ink; reactive ink; enamel ink; organic compounds; latex binders. The printing material cartridge may include an at least partially flexible container to hold the ink and a support structure to hold the container. The container may be is a bag and the support structure may be a carton box. In some examples the carton box may contain a single bag and in other examples the carton box may contain two or more bags.

In some examples, the percentage of solid pigments by weight is approximately 20-25% for white inks and 10-15% for other inks. In other examples the solid pigments by weight is 15-30% for white ink and 10-20% for other inks. In some examples the D90 particle distribution for white inks is approximately 350-550 nm and 200-450 nm for other inks. In other examples the D90 particle size distribution for white inks is 300-600 nm and 150-500 nm for other inks.

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

What is claimed is:

1. A printing material cartridge comprising:
a reservoir storing printing material to supply a printing apparatus;
memory; and
instructions for controlling a recirculation process in the printing apparatus, the instructions stored in the memory, the recirculation process to cause the printing material to move between the reservoir and another reservoir of a mixing cartridge, the mixing cartridge separately replaceable from the printing material cartridge in the printing apparatus.

2. The printing material cartridge of claim 1, further including a removal protection parameter stored in the memory, the removal protection parameter indicative of whether the printing material cartridge is removable from the printing apparatus.

3. The printing material cartridge of claim 2, wherein the removal protection parameter is indicative of a presence of at least a portion of the printing material at the second printing material cartridge.

4. The printing material cartridge of claim 1, further including a printing material characteristics parameter stored in the memory, the printing material characteristics parameter indicative of a characteristic of the printing material.

5. The printing material cartridge of claim 4, wherein the characteristic includes one or more of a pigment composition of the printing material, a concentration of dispersants for the printing material, a concentration of agents for the printing material, or a concentration of latex binders for the printing material.

6. The printing material cartridge of claim 1, further including a first cartridge identifier and a second cartridge identifier stored in the memory, the first cartridge identifier associated with the printing material cartridge and the second cartridge identifier associated with the second printing material cartridge.

7. The printing material cartridge of claim 6, wherein the second cartridge identifier is indicative of a pairing between the printing material cartridge and the second printing material cartridge.

8. A printing material cartridge comprising:
a reservoir storing printing material to supply a printing apparatus;
memory; and
a printer material counter stored in the memory, the printer material counter indicative of a total amount of the printing material in the reservoir and another reservoir of a mixing cartridge, the mixing cartridge separately replaceable from the printing material cartridge in the printing apparatus.

9. The printing material cartridge of claim 8, wherein the printer material counter has a first value, the printer material counter to maintain the first value when the printing material is moved between the reservoir and the second printing material cartridge.

10. The printing material cartridge of claim 9, wherein the first value of the printer material counter is to change in response to consumption of the printing material at the printing apparatus.

11. The printing material cartridge of claim 8, further including a reservoir printing material level parameter stored in the memory, the reservoir printing material level parameter indicative of an amount of printing material in the reservoir.

12. The printing material cartridge of claim 11, wherein a value of the reservoir printing material level parameter is to change in response to (a) consumption of the printing material at the printing apparatus and (b) movement of the printing material between the reservoir and the second printing material cartridge.

13. The printing material cartridge of claim 8, further including a removal protection parameter stored in the memory, the removal protection parameter having (a) a first status when the printing material is in the reservoir and not the second printing material cartridge and (b) a second status when a first portion of the printing material is in the reservoir and a second portion of the printing material is at second material cartridge.

14. The printing material cartridge of claim 13, wherein the first status indicates that the printing material cartridge is removable from the printing apparatus.

15. The printing material cartridge of claim 14, wherein the removal protection parameter is to change from the second status to the first status in response to recirculation of the printing material at the printing apparatus.

* * * * *